(12) United States Patent
Contell Albert et al.

(10) Patent No.: US 10,130,118 B2
(45) Date of Patent: Nov. 20, 2018

(54) FRUIT-SQUEEZING MACHINE

(71) Applicant: ZUMMO INNOVACIONES MECANICAS, S.A., Valencia (ES)

(72) Inventors: Eugenio Contell Albert, Valencia (ES); Jorge Martinez Roca, Valencia (ES)

(73) Assignee: ZUMMO INNOVACIONES MECANICAS, S.A., Valencia (ES)

( * ) Notice: Subject to any disclaimer, the term of this patent is extended or adjusted under 35 U.S.C. 154(b) by 105 days.

(21) Appl. No.: 15/123,870

(22) PCT Filed: Mar. 5, 2015

(86) PCT No.: PCT/ES2015/070158
§ 371 (c)(1),
(2) Date: Jan. 12, 2017

(87) PCT Pub. No.: WO2015/132440
PCT Pub. Date: Sep. 11, 2015

(65) Prior Publication Data
US 2017/0127714 A1    May 11, 2017

(30) Foreign Application Priority Data
Mar. 6, 2014  (ES) .................................. 201430311

(51) Int. Cl.
*A23N 1/00* (2006.01)
*A23N 1/02* (2006.01)

(52) U.S. Cl.
CPC .............. *A23N 1/02* (2013.01); *A23N 1/003* (2013.01)

(58) Field of Classification Search
CPC .................................. A23N 1/02; A23N 1/003

USPC ........................ 99/287, 289 R, 502, 504, 507
See application file for complete search history.

(56) References Cited

U.S. PATENT DOCUMENTS

| 2,270,007 A | 1/1942 | McKinnis |
| 2,737,989 A | 3/1956 | Wurgaft |
| 4,974,505 A * | 12/1990 | Torrisi .................... A23N 1/003 |
| | | 221/265 |

(Continued)

FOREIGN PATENT DOCUMENTS

| AT | 508945 A1 | 5/2011 |
| EP | 0594525 A1 | 4/1994 |

(Continued)

OTHER PUBLICATIONS

International Search Report dated Oct. 6, 2015 for PCT/ES2015/070158.
Written Opinion dated Oct. 6, 2015 for PCT/ES2015/070158.

*Primary Examiner* — Thien S Tran
(74) *Attorney, Agent, or Firm* — Lucas & Mercanti, LLP

(57) ABSTRACT

Fruit-squeezing machine with automatic fruit (7) feeder (1) and cutting and squeezing means that have a pair of rotating assemblies of three fruit (7) receiving cups (4) and a cutting assembly (5) with a blade (10) and means for extracting the rinds after squeezing the fruit, and a pair of squeezing balls (6) below the cup assemblies (4). Additionally, the machine has a juice-collecting tray (2) with a fixed? filter (8), and rind-collecting means. The cup assemblies (4) rotate towards the inside of the machine, which has motor means that synchronize the continuous movements of the feeder (1) with the movement of the cutting and squeezing means.

8 Claims, 9 Drawing Sheets

(56) References Cited

U.S. PATENT DOCUMENTS 5,170,699 A    12/1992  Senalada
5,406,882 A  *  4/1995  Shaanan ................. A47J 31/18
                                                      99/287

FOREIGN PATENT DOCUMENTS

ES         2091702  A2   11/1996
WO       2013038039 A1    3/2013

* cited by examiner

FRUIT-SQUEEZING MACHINE

CROSS REFERENCE TO RELATED APPLICATION

This application is a 371 of PCT/ES2015/070158 filed on Mar. 5, 2015, which claims priority of Spanish Application No. P201430311 filed on Mar. 6, 2014, both of which are incorporated herein by reference.

FIELD OF THE INVENTION

The present invention belongs to the technical field of the agricultural-food industry, namely to that of fruit-squeezing machines, mainly oranges, although other citrus fruits too. More specifically, the present invention relates to fruit-squeezing machines with a feeder, cutting means for cutting the fruits into two halves, and means for squeezing those two halves, with a tray for collecting the juice squeezed from the fruits, and means for collecting the rind of the squeezed fruits. The invention particularly relates to a fruit-squeezing machine in which the cutting means have rotating cups to receive the fruits, a blade for cutting them into two halves, and balls for squeezing the halves of these fruits. In addition, the squeezing machine has motor means that synchronize the continuous movement of the fruit feeder with the movement of the cutting and squeezing means.

BACKGROUND OF THE INVENTION

From the state of the art there are known various automatic fruit-squeezing machines, mainly oranges, although other citrus too. These machines may be fed either manually or automatically, and may have different supplements or additions, although all are mainly based on the movement of the orange so the latter is cut, the resulting portions being subsequently squeezed.

In general, most of high-capacity industrial squeezers, or those used in the hotel and catering industry and equivalents, extract the juice by means of a rotating movement, simultaneous and coincident of one of the alveoli or cups with squeezing reamers or balls corresponding thereto. Generally, the methods for cutting the fruits into two portions are not carried out uniformly, obtaining irregular fruit portions, which affects the performance of the squeezing machine.

Document ES2091702B1 shows a citrus-fruit-squeezing machine, which incorporates a "revolver" system with a high-load capacity, wherein the oranges and other fruits are placed. This machine already incorporates a mechanism for squeezing each one of the fruits, the juice extraction being carried out by means of a vertical movement in which each one of the half-fruits located in its corresponding location will be pressed against the respective squeezing reamer or ball.

However it has been verified that a drawback of the known fruit-squeezing machines, is that the cut into two halves carried out on the particular fruit to be squeezed, is not performed properly since the fruit is not positioned correctly during the cutting process into two portions, thus not obtaining two half-fruits of the same size, and as a consequence not obtaining either an optimal performance in the ulterior squeezing process.

Document PCT/ES2012/070394, from the same applicant of the present application, shows a fruit-squeezing machine that solves the problem described above by means of precise cutting means, in which by means of the rotation of the cups that house the fruit symmetrically, said fruit is cut into two equal half-fruits. The cups place these half-fruits into a facing position and compress them against squeezing balls, collecting the juice on one side, and the rind of the squeezed fruit on the other.

The problem that this squeezing machine as described in the above document has, as well as several similar machines, is that since it is provided with two cups and two squeezing balls, although it enables squeezing the two half-fruits at the same time, it is excessively cumbersome, which prevents its installation in facilities where the space available is reduced.

The Spanish patent application P201230986, also from the same applicant of the present application, shows a fruit-squeezing machine with a reduced size with regard to the size of conventional machines, which enables its being installed in facilities with less available space.

However, this machine of the previous document has one single cup for receiving the fruits and one single squeezing ball, which allows less speed than that which a machine provided with various cups and balls would allow, the juice production being lower.

Therefore, it is desirable an automatic fruit-squeezing machine that supplies juice in a quick and efficient manner, avoiding the existing drawbacks of the previous machines from the state of the art.

DESCRIPTION OF THE INVENTION

The present invention resolves the problems existing in the state of the art by means of a fruit-squeezing machine, which is formed by an automatic fruit feeder, by fruit cutting and squeezing means arranged below the feeder, a tray for collecting the juice obtained from the fruits, arranged below the cutting and squeezing means, with a filter for collecting the pulp and the seeds, and means for collecting the rind of the squeezed fruits.

The fruit cutting and squeezing means have a pair of rotating assemblies of fruit receiving cups, as well as, a cutting assembly arranged below the cup assemblies. The cutting assembly has in turn a blade centered with regard to both cup assemblies that cuts the fruit into two halves, and means for extracting the rind of the squeezed fruits. Additionally, the fruit cutting and squeezing means have a pair of fruit-squeezing balls, each one of them arranged below one of the cup assemblies.

Each cup assembly has three cups that are arranged radially and spaced 120° from one another. Both assemblies rotate in opposite directions to one another, towards the inside of the machine.

The fruit-squeezing machine, object of the present invention, has motor means that synchronize the continuous movement of the feeder with the movement of the cutting and squeezing means. During this movement the elements of the machine exhibit different positions.

Firstly, a receiving position for collecting the fruit from the feeder between the facing cups of each assembly.

These facing cups, by means of their opposite rotations towards the inside of the machine, guide the fruit to a cutting position in the cutting assembly, wherein the blade cuts the fruit into two halves that are substantially equal, each half remaining in the cup of one assembly, Next, the assemblies continue rotating until the cups containing the half-fruits are arranged vertically.

From that position, by means of a downward vertical movement of the cup assemblies and the cutting assembly the half-fruits pass to a squeezing position by the pressure exerted against the balls, and simultaneously the facing cups of the assemblies in that new position receive a new fruit from the feeder, the rind-extracting means extracting the rinds of the squeezed half-fruits by means of an upward vertical movement of the cutting assembly along with the cup assemblies.

When the machine is in operation, the preceding movements and positions are repeated continuously, for the three pairs of facing cups, with the particularity that from the second fruit on, while one of the fruits is being cut and squeezed, the rind of the fruit that has just been squeezed is extracted and removed.

Thus, by means of the rotation of the three pairs of cups, always in the same direction, and opposite to one another, towards the center of the machine, and the up-and-down vertical movement of the rotating cup assemblies and the cutting assembly en bloc, the squeezing rate obtained is much higher than that of conventional squeezing machines, as well as, a convenient removal of the rinds, which provides greater efficiency to the fruit-squeezing machine, object of the present invention.

Preferably, the rind-extracting means of the cutting assembly comprise a plurality of radial side ribs. According to this embodiment, the squeezing balls have a plurality of radial grooves complementary to the radial side ribs of the cutting assembly, such that the side ribs are inserted into and guided by the radial grooves of the squeezing balls in the downward vertical movement of the cup assemblies and cutting assembly. This operation of inserting the side ribs is carried out before starting the machine, for example after finishing the workday and washing all the parts. Thus, the ribs are always guided, never loose contact with the grooves of the balls. In this way, in the upward vertical movement of the cutting assembly along with the cup assemblies, the side ribs carry out the extraction of the rinds.

According to a particular embodiment of the invention, the motor means providing movement to the elements of the squeezing machine and synchronizing the continuous movement of the feeder with the movement of the cutting and squeezing means, have a reducer connected to a cam by means of a lower horizontal shaft. This cam actuates a rod, which in turn moves a pushing assembly arranged on a pushing plate in which a number of wedges are arranged and joined by means of springs, which cause rotate a number of ratchets always in the same direction, with a synchronized stop. These ratchets actuate the shafts of the pair of cup rotating assemblies, giving rise to the rotating movement thereof.

Furthermore, the pushing assembly is arranged on a slider that is moved along vertical guides, this way, the pushing assembly is moved vertically by the rod between an upper position, in which the cutting and squeezing means cut the fruit by means of the rotation of the cups over the cutting assembly, and a lower position, in which the cutting and squeezing means squeeze the half-fruits by the pressure exerted by the cups against the squeezing balls.

Additionally, in order to synchronize the movement of the cutting and squeezing means with that of the feeder, the machine has a lower pinion which is also connected to the lower horizontal shaft. This lower pinion actuates by means of a chain an upper pinion that is mounted on an upper horizontal shaft. In addition, on that upper horizontal shaft is mounted a conical pinion, which actuates a ring gear mounted on a vertical shaft. The fruit feeder is fixed to said ring gear, being actuated by the latter.

In this way, all the movements of the machine elements, including the continuous movement of the feeder, the rotation movements for cutting and extracting the rinds, and the vertical movement for carrying out the squeezing, initially stem from the same lower horizontal shaft, mounted on the reducer 12. By means of the different mechanical elements described previously, they are synchronized so as to feed the cups at the right moment with the fruit fall from the feeder.

According to a preferred embodiment of the invention, the squeezing machine has a filter-cleaning assembly to carry out the automatic cleaning of the fixed filter of the tray by removing pulp and seeds collected by said juice-collecting fixed filter. The filter-cleaning assembly consists of a mobile scraper mounted on two end shafts, mounted on the fixed filter, which as it moves along the entire filter drives pulp and seeds to a drain of the juice-collecting tray. As an alternative, and depending on the design of the format chosen for the juice exit, the filter could be arranged in a tray-faucet or in a tank with faucet.

BRIEF DESCRIPTION OF THE DRAWINGS

Next, in order to facilitate the understanding of the invention, in an illustrative rather than limitative manner, an embodiment of the invention, is described below making reference to a series of figures.

Figure 1:
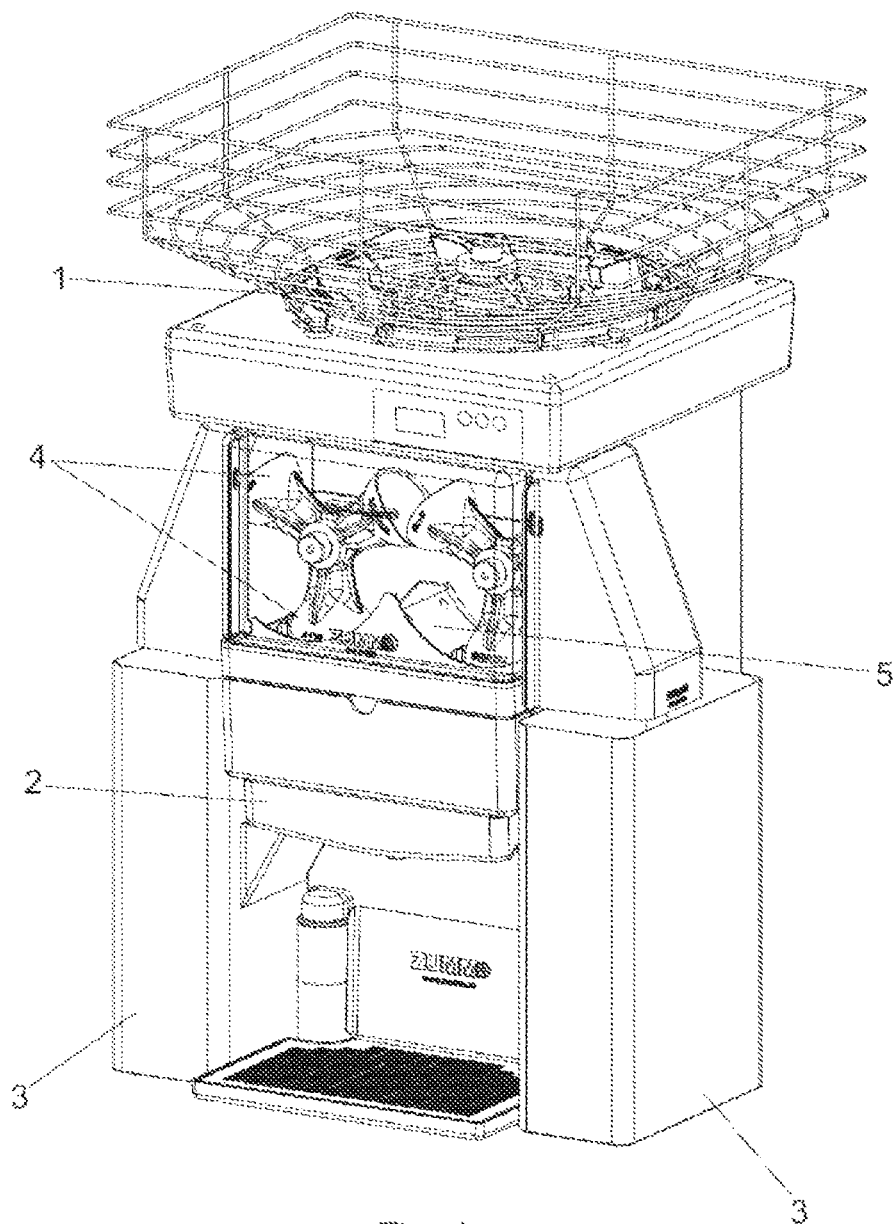
FIG. 1 is a perspective view of an embodiment of a fruit-squeezing machine, object of the present invention.
Figure 2:
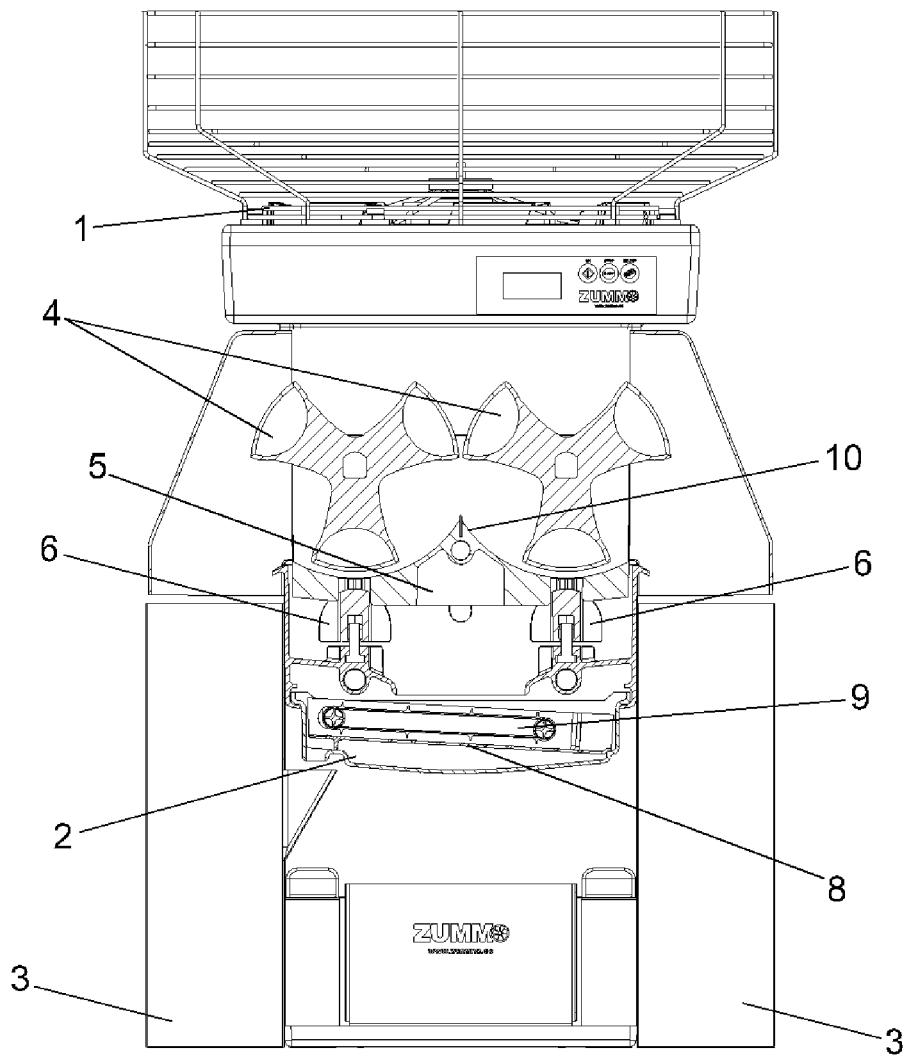
FIG. 2 is a frontal cross-sectional view of the squeezing machine wherein the main elements are exhibited.

In these figures reference is made to a set of elements, which are:

1. fruit feeder
2. a tray for collecting the juice obtained from the fruits
3. buckets for collecting the rinds of the squeezed fruits
4. fruit-receiving cups from the cutting and squeezing means
5. cutting assembly of the fruit cutting and squeezing means
6. fruit-squeezing balls of the cutting and squeezing means
7. fruit
7' half-fruits
8 fixed filter of the juice-collecting tray
9 filter-cleaning assembly
10 blade of the cutting assembly
11 ribs of the rind-extracting means of the cutting assembly
12 reducer
13 lower horizontal shaft
14 lower pinion
15 rod
16 chain
17 upper pinion 18 upper horizontal shaft
19 conical pinion
20 vertical shaft
21 ring gear
22 pushing assembly
23 slider
24 pushing plate
25 vertical guides
26 wedges
27 springs
28 ratchets of the motor means connected to the rotating shafts of the cup assemblies
29 rotating shafts of the cup assemblies
30 cam
31 scraper of the filter-cleaning assembly
32 motor shaft of the filter-cleaning assembly
33 driven shaft of the filter-cleaning assembly
34 drain

DETAILED DESCRIPTION OF THE INVENTION

The object of the present invention is a fruit-squeezing machine.

As can be appreciated in the figures, the fruit-squeezing machine is generally formed by an automatic fruit 7 feeder 1, by fruit 7 cutting and squeezing means, which are arranged below the feeder 1, by a tray 2 for collecting the juice obtained from the fruits 7, arranged below the cutting and squeezing means, and that comprises a fixed filter 8 for collecting the pulp and seeds, and by rind-collecting means.

The fruit 7 cutting and squeezing means comprise in turn a pair of rotating assemblies 4 of fruit 7 receiving cups, a cutting assembly 5 arranged below the cup assemblies 4, and a pair of fruit 7 squeezing balls 6, each one of them arranged below one of the cup assemblies 4.

The cutting assembly 5 has in turn a blade 10 that cuts the fruit into two halves, and means for extracting the rind of the squeezed fruits.

As shown in the figures, in the squeezing machine, object of the present invention, each cup assembly 4 is formed by three cups 4 arranged radially and spaced from one another 120°, both cup assemblies 4 rotating in opposite directions to one another, towards the inside of the machine.

In addition, the machine has motor means that synchronize the continuous movement of the feeder 1 with the movement of the cutting and squeezing means, which allow reaching accurately the different positions for receiving the fruit 7, cutting thereof, as well as, the positions for squeezing the fruit and removing the rinds of the squeezed fruit.

FIGS. 3 to 11 show the different positions of the elements of a squeezing machine according to the working positions thereof.

Figure 3:
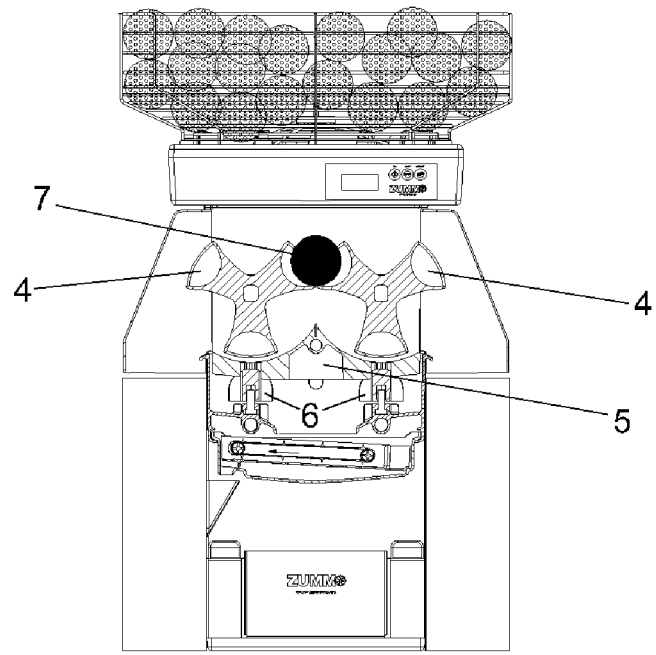
FIGS. 3 to 11 show the different positions of the elements of a squeezing machine according to the working positions thereof.

FIG. 3 shows how from a previous operation, there is a fruit 7, specifically an orange, which is located in the cups 4 and there are other oranges stored in a hopper that supplies the automatic feeder 1. The movement of the feeder 1 is synchronized with that of the cups 4 to ensure the fruits fall at the right moment.

Figure 4:
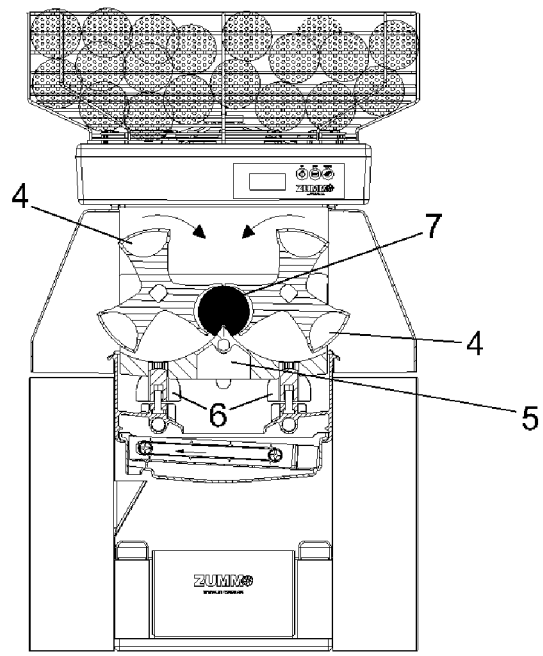
Figure 5:
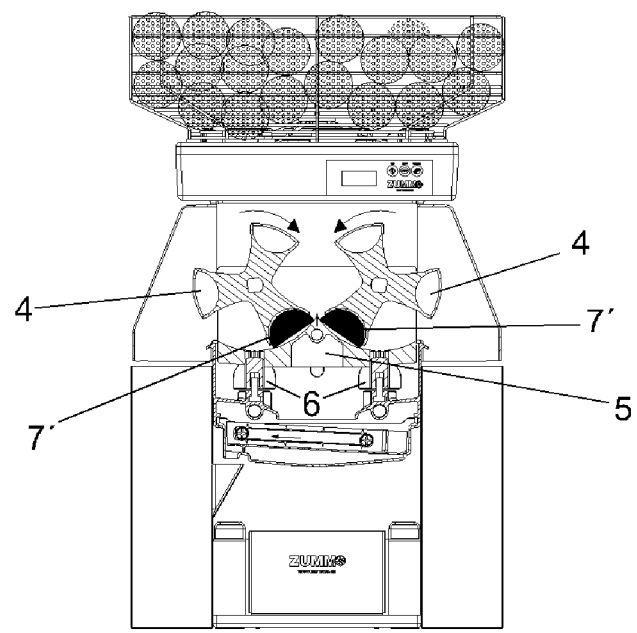

FIGS. 4 and 5 show how the cups 4 rotate in opposite directions, towards the inside of the machine, and the cutting assembly 5 is maintained fixed, accordingly, the blade 10 starts cutting the fruit 7 into two halves.

Figure 6:
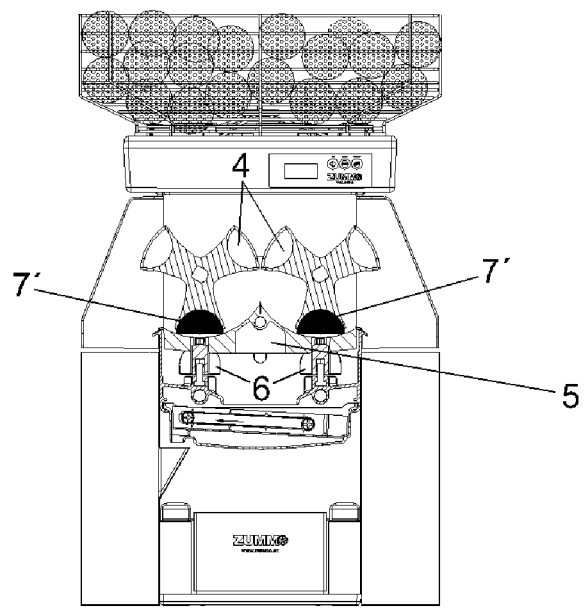

As can be seen in FIGS. 5 and 6, the two half-fruits 7' driven by the cups 4 follow their course across the cutting assembly 5, which is fixed, until reaching the vertical where they stop and are positioned on the ribs 11 of the rind-extracting means of the cutting assembly 5.

Figure 7:
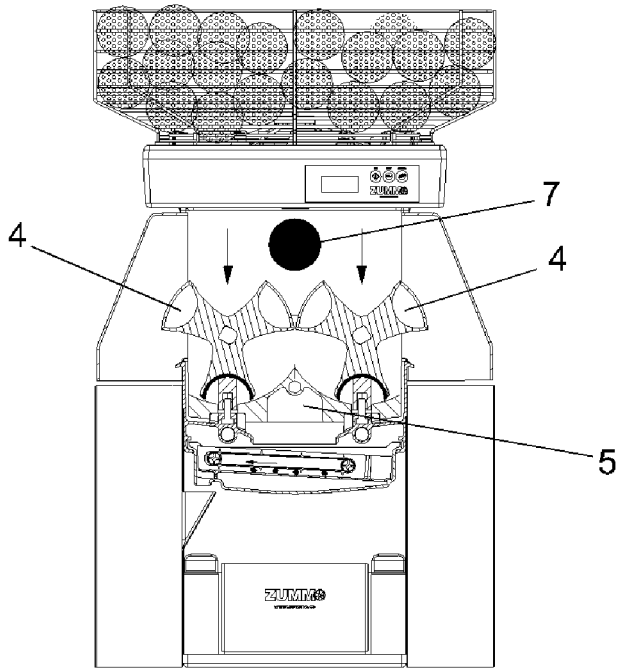

According to FIG. 7, the cups 4 and the cutting assembly 5 come down simultaneously and the fruit 7 is squeezed against the squeezing ball 6 by compression. The automatic filter-cleaning assembly 9, which is continuously in operation whenever the machine is working, starts cleaning the pulp and seeds of the squeezed fruit 7. The juice is collected and channeled to the container outside the machine by means of the filtering tray 2. In the downward course of the cups 4 and cutting assembly 5, the automatic feeder 1, synchronized with the movement thereof, deposits a new fruit 7 into the cups 4.

Figure 8:
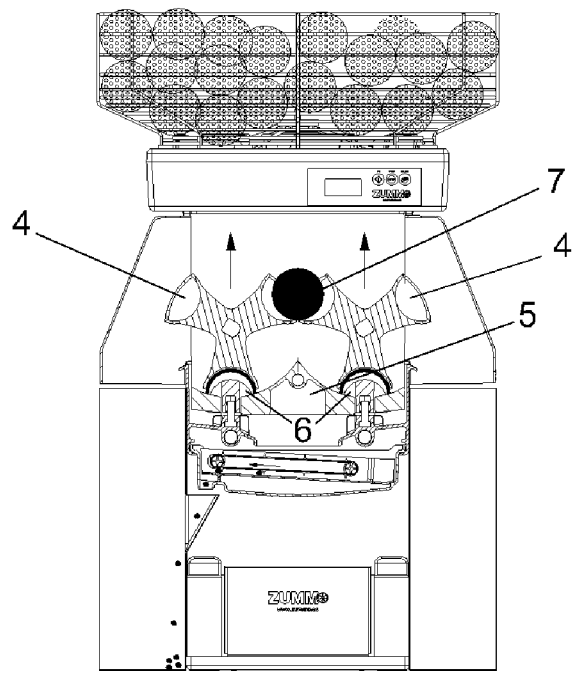

FIG. 8 shows how the cups 4 and cutting assembly 5 move up simultaneously, and the extracting means extract the rind of the squeezed fruit 7. The filter-cleaning assembly 9 removes the pulp and seeds through a drain 34 comprised in the tray 2, and channels them inside the buckets 3 used for storing the rinds.

Figure 9:
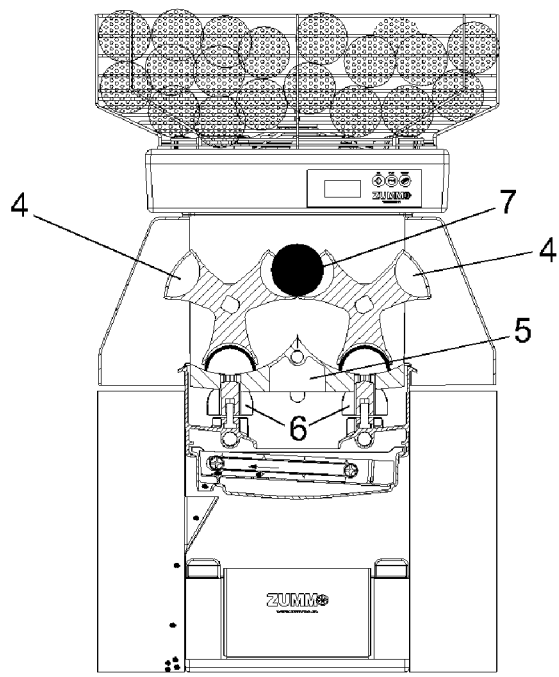

FIG. 9 shows how the cups 4 and cutting assembly 5 have finished moving up, and the rind is on the ribs 11 of the extraction means of the cutting assembly 5.

Figure 10:
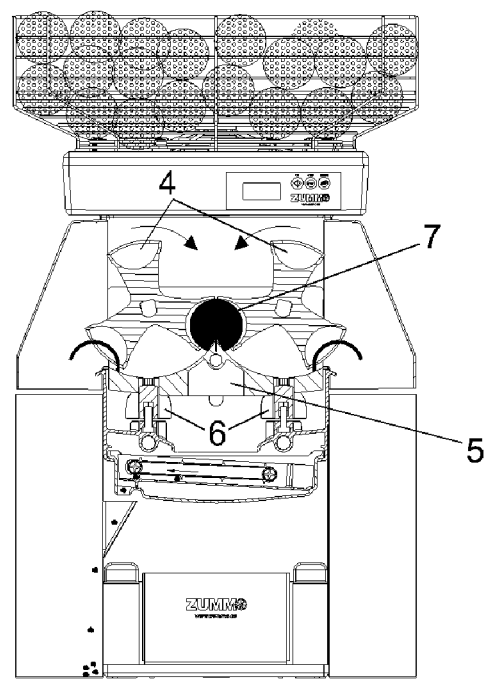

As observed in FIG. 10, the cups 4 rotate towards the inside of the machine and the cutting assembly 5 remains fixed, thus starting a new cycle and repeating the cutting process of the fruit 7. In turn, the rinds of the fruit that are on the ribs 11 of the cutting assembly are driven by the cups 4 towards the rind-collecting buckets 3.

Figure 11:
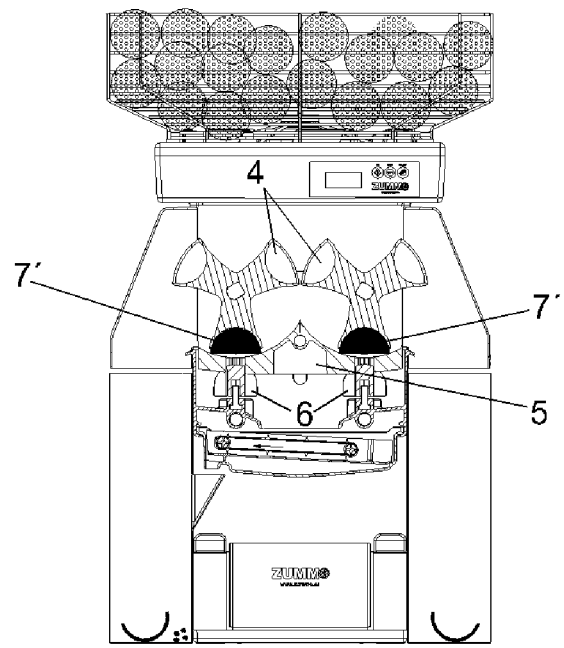

As can be appreciated in FIG. 11, the two half-fruits 7' driven by the cups 4 follow their course through the cutting assembly 5, which is fixed, until reaching the vertical where they stop and are positioned on the ribs 11 of the rind-extracting means of the cutting assembly 5 to initiate a new squeezing cycle. Finally, the extracted rinds are stored into the buckets 3. As can be observed in the figures, the extracted rinds are inserted in the buckets 3 by the rotation of the cups 4. The cutting assembly 5, which in that moment is fixed, thanks to its curved design on the sides, guides the rinds, as it moves with the cups 4, inside the buckets 3.

According to a preferred embodiment of the invention, the rind-extracting means of the cutting assembly 5 have a plurality of radial side ribs 11, whereas the squeezing balls 6 have a plurality of radial grooves complementary to the radial side ribs 11 of the cutting assembly 5. In this way, the cup assemblies 4 and cutting assembly 5, in the common downward-vertical movement thereof, lower the side ribs 11, which are inserted and guided by the radial grooves of the squeezing balls 6, whereas in the common upward-vertical movement of the cutting assembly 5 along with the cup assemblies 4, the side ribs 11 carry out the extraction of the rinds accompanying them.

Figure 12:
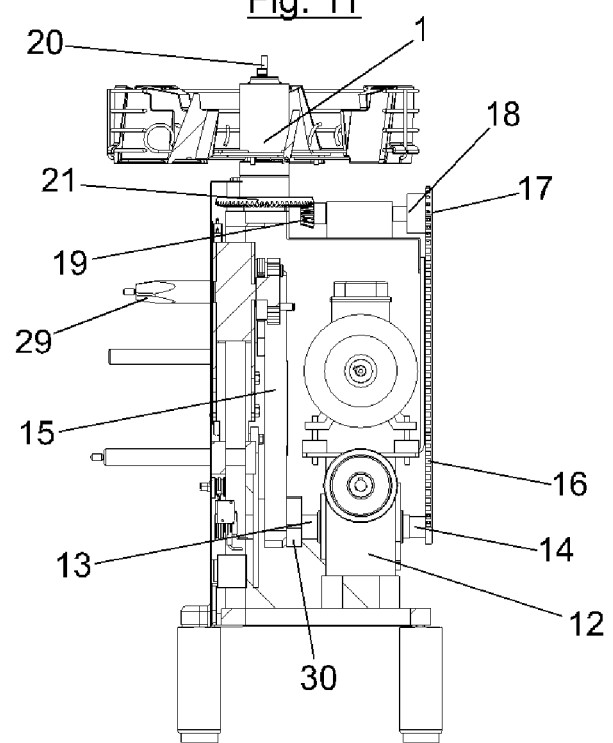
FIG. 12 is a side cross-sectional view of the squeezing machine that shows an embodiment of the motor means.
Figure 13:
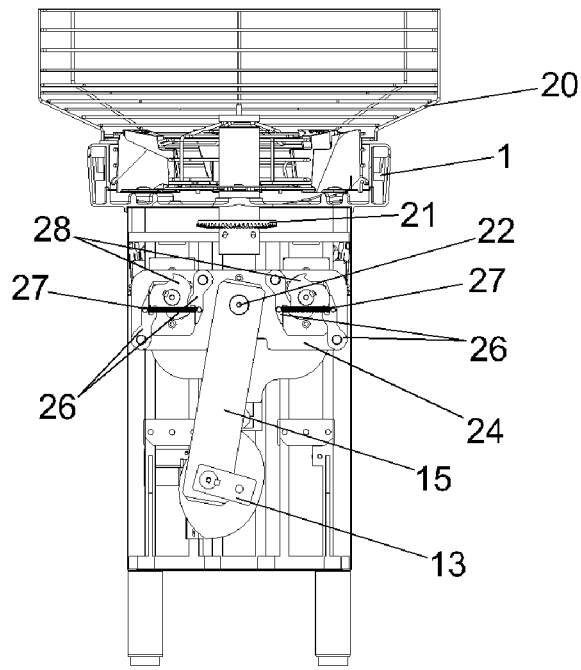
FIG. 13 is a rear cross-sectional view of the squeezing machine that shows an embodiment of the motor means.
Figure 14:
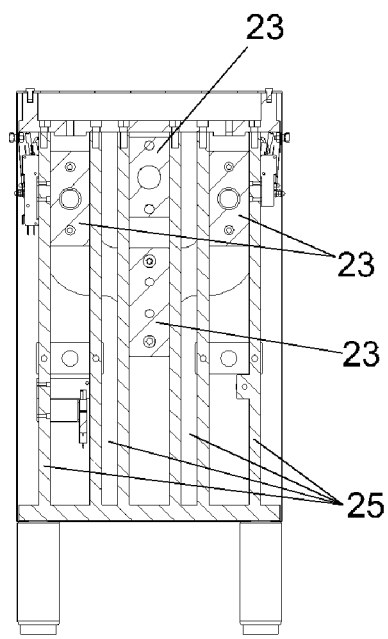
FIG. 14 is a rear cross-sectional view of the squeezing machine similar to that of the previous figure, in which for clarity purposes certain elements have been removed, so as to show the sliders and guides.
Figure 15:
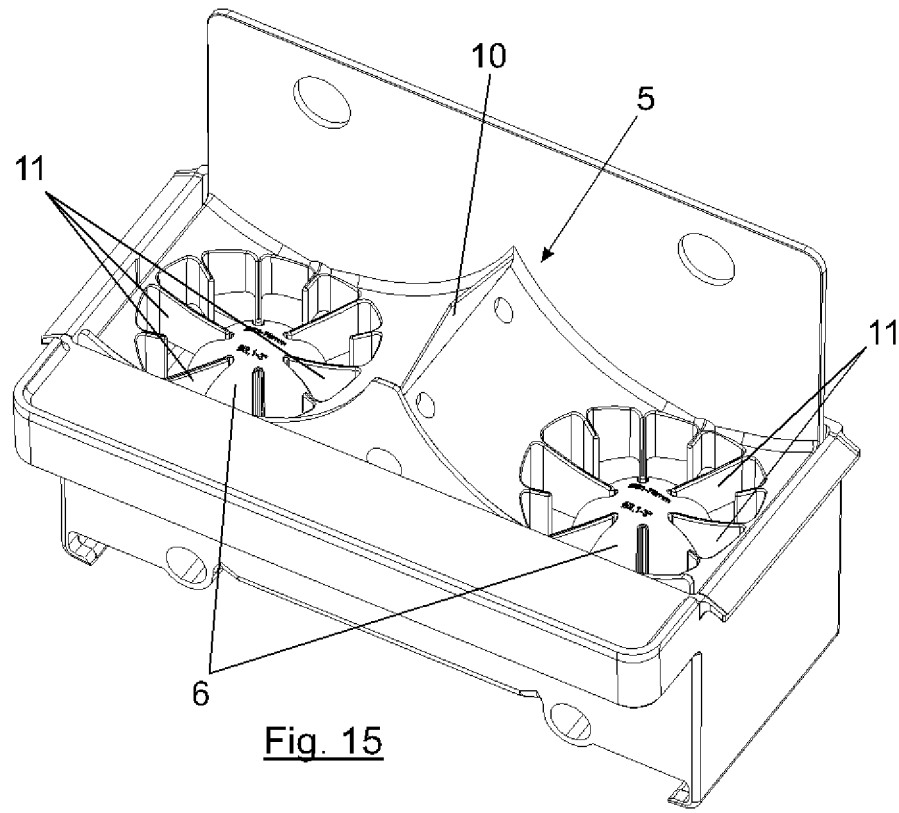
FIG. 15 shows in detail an embodiment of the cutting assembly arranged on the squeezing balls, which illustrates an embodiment of the rind-extracting means.
Figure 16:
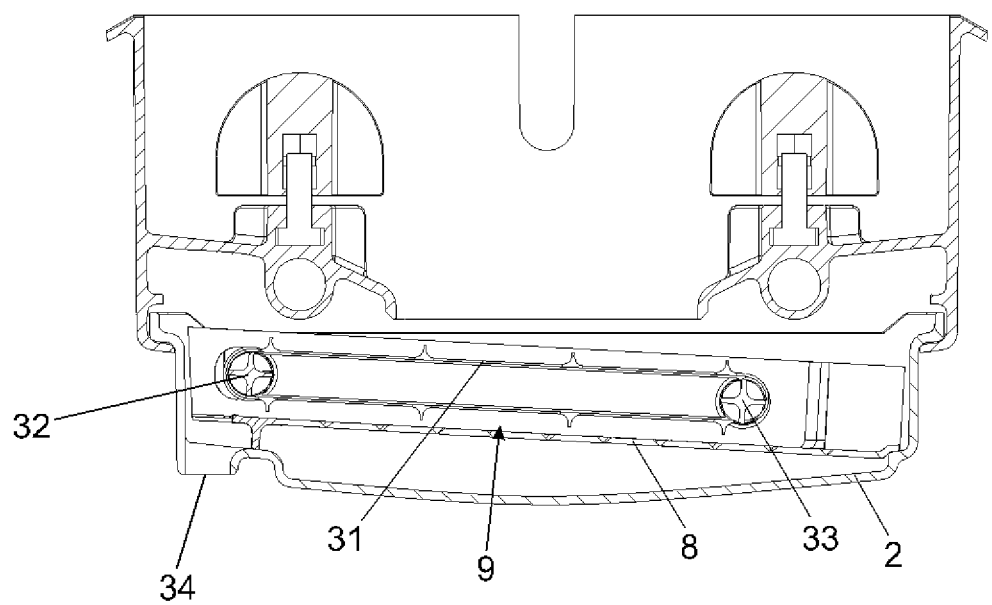
FIG. 16 shows a particular embodiment of a filter-cleaning assembly on a fixed filter arranged on the juice-collecting tray.

According to a preferred embodiment of the invention, and as shown in FIGS. 12 to 14, the embodiment of the motor means providing the elements of the squeezing machine with movement and synchronizing the continuous movement of the feeder with the movement of the fruit cutting and squeezing means, is as follows:

For the actuation thereof, the squeezing machine has a reducer 12 from which a lower horizontal shaft 13 comes out. On one end of said lower horizontal shaft 13 is mounted a lower pinion 14 and on the other end there is a cam 30 that moves a rod 15, which transmits movement to the entire mechanism of the fruit 7 cutting and squeezing means.

As can be seen in FIGS. 12 and 13, the end of the rod 15 is mounted on a pushing assembly 22, which in turn is mounted on a slider 23 and where a pushing plate 24 is mounted. The whole assembly is mounted between vertical guides 25 and is actuated by the rod 15, thus achieving the movement of the assembly along a vertical course, which comprises an upper and a lower position. In the upper position the cutting and squeezing means cut the fruit 7, whereas in the lower position the cutting and squeezing means squeeze the half-fruits 7'.

In the pushing plate 24 there are wedges 26 arranged, which are joined by means of springs 27, that are in charge of rotating ratchets 28 always in the same rotation direction, and since they are integral to the horizontal rotating shaft 29 of the triple cup assemblies 4, they rotate 120° and their stop is synchronized to initiate the lowering in the inverted vertical position of the cups 4.

In order to synchronize the movement of the fruit cutting and squeezing means with that of the feeder 1, the lower pinion 14 moves through a chain 16 an upper pinion 17, which is mounted on an upper horizontal shaft 18, on which is further mounted a conical pinion 19. A ring gear 21 is mounted on a vertical shaft 20, in a predetermined position for achieving the desired relation with the conical pinion 19 and with that the synchronism between the movement of the feeder 1 with that of the cutting and squeezing means. In the upper portion of the ring gear 21 there is an arrangement of holes where the bolts of the feeder 1 are housed, and which ensure the correct positioning thereof in a determined position so it feeds the fruit 7 at the right moment.

Thus, all the movements, the continuous movement of the feeder 1, as well as, the rotating movements, i.e., "cut and extraction" and the vertical movement, i.e., "squeezing", initially stem from the same lower horizontal shaft 13, mounted on the reducer 12, and by means of the different mechanical elements, previously described, the synchronism is obtained so as to feed at the right moment the cups 4 with the fruit 7 falling from the feeder.

According to a particular embodiment of the invention, the squeezing machine has a filter-cleaning assembly 9 for carrying out the cleaning of the fixed filter 8 of the juice-collecting tray 2. The filter-cleaning assembly 9, consists of a mobile scraper 31 mounted between two end shafts, which in turn are mounted on the fixed filter 8, a motor shaft 32, which moves the scraper 31, and a driven shaft 33, which along with the motor shaft 32 positions and centers the scraper 31. In particular, the motor shaft 32 is connected to the lower horizontal shaft 13, which comes out from the reducer 12 by means of a mechanism of pulleys and belts.

The movement of the scraper 31 along the entire fixed filter 8 drives pulp and seeds that have been deposited on said fixed filter 8 to a drain 34 of the juice-collecting tray 2. Preferably, this drain 34 is arranged on one of the ends of the tray 2, and the pulp and seeds driven and removed from the fixed filter 8 are deposited in one of the buckets 3.

Once the invention has been clearly described, it should be noted that the particular embodiments, described above, are susceptible to modifications of detail provided they do not alter the fundamental principle and essence of the invention.

The invention claimed is:

1. A fruit-squeezing machine, comprising:
   an automatic fruit feeder,
   fruit cutting and squeezing means, arranged below the feeder, which in turn comprise:
     a pair of rotating cup assemblies for fruit reception
     a cutting assembly arranged below the cup assemblies comprising:
       a blade that cuts the fruit into two halves,
       and means for extracting rind of the squeezed fruits,
     and a pair of fruit squeezing balls, each one of fruit squeezing balls arranged below one of the cup assemblies,
   a tray for collecting juice obtained from the fruits, arranged below the cutting and squeezing means,
   a fixed filter for collecting pulp and seeds,
   and means for collecting the rinds, said fruit-squeezing machine is characterized in that:
   each cup assembly has three cups arranged radially and spaced 120° from one another, and both assemblies rotate in opposite directions to one another, towards inside of the machine,
   and in that said machine comprises motor means that synchronize continuous movement of the feeder with movement of the cutting and squeezing means, displaying in said movement:
     a receiving position for collecting the fruit from the feeder between facing cups of each assembly, which guide the fruit as the fruit rotate to
     a fruit cutting position in the cutting assembly in which the blade cuts the fruit into two halves, each half remaining in the cup of an assembly, and the assemblies continue rotating until the cups containing the half-fruits are arranged vertically, passing by means of a downward vertical movement of the cup assemblies and the cutting assembly to
     a squeezing position of the half-fruits by compression against the balls, and simultaneously the facing cups receive a new fruit from the feeder, the rind-extracting means extracting the new fruit by means of an upward vertical movement of the cutting assembly along with the cup assemblies,
   wherein the motor means that synchronize the continuous movement of the feeder with the movement of the cutting and squeezing means comprise:
     a reducer connected to a lower horizontal shaft, which has a cam that actuates a rod, which in turn moves a pushing assembly arranged on a pushing plate in which wedges are arranged, which are joined by means of springs that rotate ratchets always in a same direction, actuating said ratchets of rotating shafts of the pair of cup rotating assemblies,
     the pushing assembly being arranged in a slider that is movable a long vertical guides, and the pushing assembly being moved vertically by the rod between an upper position, in which the cutting and squeezing means cut the fruit, and a lower position, in which the cutting and squeezing means squeeze the half-fruits, and
     a lower pinion that actuates by means of a chain an upper pinion mounted on an upper horizontal shaft additionally connected to the lower horizontal shaft, on which is additionally mounted a conical pinion, which actuates a ring gear mounted on a vertical shaft, the fruit feeder being fixed to said ring gear and being actuated by the vertical shaft.

2. The fruit-squeezing machine, according to claim 1, wherein:
   the rind-extracting means of the cutting assembly comprise a plurality of radial side ribs,
   in that the squeezing balls comprise a plurality of a radial grooves complementary to the radial side ribs of the cutting assembly,
   and in that the side ribs are inserted and guided into the radial grooves of the squeezing balls in the downward vertical movement of the cup assemblies and cutting assembly, said side ribs thus extracting the rinds in the upward vertical movement of the cutting assembly along with the cup assemblies.

3. The fruit-squeezing machine, according to claim 1, comprising a filter-cleaning assembly for cleaning the fixed filter of the juice-collecting tray, which in turn comprises a mobile scraper mounted between two end shafts, in turn mounted on the fixed filter, wherein the mobile scraper moves along an entire fixed filter and drives pulp and seeds to a drain of the juice-collecting tray.

4. The fruit-squeezing machine, according to claim 1, wherein the rind-collecting means comprise a pair of buckets, each one of buckets arranged on one side of the juice-collecting tray.

5. A fruit-squeezing machine, comprising:
an automatic fruit feeder,
fruit cutting and squeezing means, arranged below the feeder, which in turn comprise:
   a pair of rotating cup assemblies for fruit reception
   a cutting assembly arranged below the cup assemblies comprising:
      a blade that cuts the fruit into two halves,
      and means for extracting rind of the squeezed fruits,
      and a pair of fruit squeezing balls, each one of fruit squeezing balls arranged below one of the cup assemblies,
a tray for collecting juice obtained from the fruits arranged below the cutting and squeezing means
a fixed filter for collecting pulp and seeds,
and means for collecting the rinds, said fruit-squeezing machine is characterized in that:
each cup assembly has three cups arranged radially and spaced 120° from one another, and both assemblies rotate in opposite directions to one another, towards inside of the machine,
and in that said machine comprises motor means that synchronize continuous movement of the feeder with movement of the cutting and squeezing means, displaying in said movement:
   a receiving position for collecting the fruit from the feeder between facing cups of each assembly, which guide the fruit as the fruit rotate to
   a fruit cutting position in the cutting assembly in which the blade cuts the fruit into two halves, each half remaining in the cup of an assembly, and the assemblies continue rotating until the cups containing the half-fruits are arranged vertically, passing by means of a downward vertical movement of the cup assemblies and the cutting assembly to
   a squeezing position of the half-fruits by compression against the balls, and simultaneously the facing cups receive a new fruit from the feeder, the rind-extracting means extracting the new fruit by means of an upward vertical movement of the cutting assembly along with the cup assemblies,
wherein:
the rind-extracting means of the cutting assembly comprise a plurality of radial side ribs,
in that the squeezing balls comprise a plurality of radial grooves complementary to the radial side ribs of the cutting assembly,
and in that the side ribs are inserted and guided into the radial grooves of the squeezing balls in the downward vertical movement of the cup assemblies and cutting assembly, said side ribs thus extracting the rinds in the upward vertical movement of the cutting assembly along with the cup assemblies.

6. The fruit-squeezing machine, according to claim 5, wherein the motor means that synchronize the continuous movement of the feeder with the movement of the cutting and squeezing means comprise:
   a reducer connected to a lower horizontal shaft, which has a cam that actuates a rod, which in turn moves a pushing assembly arranged on a pushing plate in which wedges are arranged, which are joined by means of springs that rotate ratchets always in a same direction, actuating said ratchets of rotating shafts of the pair of cup rotating assemblies,
   the pushing assembly being arranged in a slider that is movable along vertical guides, and the pushing assembly being moved vertically by the rod between an upper position, in which the cutting and squeezing means cut the fruit, and a lower position, in which the cutting and squeezing means squeeze the half-fruits,
   and a lower pinion that actuates by means of a chain an upper pinion mounted on an upper horizontal shaft additionally connected to the lower horizontal shaft, on which is additionally mounted a conical pinion, which actuates a ring gear mounted on a vertical shaft, the fruit feeder being fixed to said ring gear and being actuated by the vertical shaft.

7. The fruit-squeezing machine, according to claim 5, comprising a filter-cleaning assembly for cleaning the fixed filter of the juice-collecting tray, which in turn comprises a mobile scraper mounted between two end shafts, in turn mounted on the fixed filter, wherein the mobile scraper moves along an entire fixed filter and drives pulp and seeds to a drain of the juice-collecting tray.

8. The fruit-squeezing machine, according to claim 5, wherein the rind-collecting means comprise a pair of buckets, each one of buckets arranged on one side of the juice-collecting tray.

* * * * *